(12) United States Patent
Sripada et al.

(10) Patent No.: US 10,311,145 B2
(45) Date of Patent: *Jun. 4, 2019

(54) METHOD AND APPARATUS FOR EXPRESSING TIME IN AN OUTPUT TEXT

(71) Applicant: ARRIA DATA2TEXT LIMITED, Aberdeen (GB)

(72) Inventors: Gowri Somayajulu Sripada, Westhill (GB); Neil Burnett, Inverurie (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,826

(22) Filed: Jan. 16, 2018

(65) Prior Publication Data

US 2018/0276200 A1 Sep. 27, 2018

Related U.S. Application Data

(63) Continuation of application No. 14/702,352, filed on May 1, 2015, now Pat. No. 9,904,676, which is a
(Continued)

(51) Int. Cl.
*G06F 17/27* (2006.01)
*G06F 17/28* (2006.01)
*G06Q 10/06* (2012.01)

(52) U.S. Cl.
CPC ............ *G06F 17/28* (2013.01); *G06F 17/279* (2013.01); *G06F 17/2785* (2013.01); *G06F 17/2881* (2013.01); *G06Q 10/06* (2013.01)

(58) Field of Classification Search
CPC . G06F 17/2881; G06F 17/2785; G06F 17/279
See application file for complete search history.

(56) References Cited

U.S. PATENT DOCUMENTS 5,181,250 A 1/1993 Morgan et al.
5,237,502 A 8/1993 White et al.
(Continued)

FOREIGN PATENT DOCUMENTS

AU 2011247830 B2 12/2011
AU 2011253627 B2 12/2011
(Continued)

OTHER PUBLICATIONS

Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2011).
(Continued)

*Primary Examiner* — Eric Yen
(74) *Attorney, Agent, or Firm* — Alston & Bird LLP

(57) ABSTRACT

Methods, apparatuses, and computer program products are described herein that are configured to express a time in an output text. In some example embodiments, a method is provided that comprises identifying a time period to be described linguistically in an output text. The method of this embodiment may also include identifying a communicative context for the output text. The method of this embodiment may also include determining one or more temporal reference frames that are applicable to the time period and a domain defined by the communicative context. The method of this embodiment may also include generating a phrase specification that linguistically describes the time period based on the descriptor that is defined by a temporal reference frame of the one or more temporal reference frames. In some examples, the descriptor specifies a time window that is inclusive of at least a portion of the time period to be described linguistically.

21 Claims, 4 Drawing Sheets

Related U.S. Application Data continuation of application No. PCT/IB2012/056514, filed on Nov. 16, 2012.

(56) References Cited

U.S. PATENT DOCUMENTS

| | | | |
|---|---|---|---|
| 5,311,429 A | 5/1994 | Tominaga | |
| 5,321,608 A | 6/1994 | Namba et al. | |
| 5,369,574 A | 11/1994 | Masegi et al. | |
| 5,629,687 A | 5/1997 | Sutton et al. | |
| 5,634,084 A | 5/1997 | Malsheen et al. | |
| 5,794,177 A | 8/1998 | Carus et al. | |
| 5,802,488 A * | 9/1998 | Edatsune | G10L 15/26 704/231 |
| 5,924,089 A | 7/1999 | Mocek et al. | |
| 6,023,669 A | 2/2000 | Suda et al. | |
| 6,078,914 A | 6/2000 | Redfern | |
| 6,138,087 A | 10/2000 | Budzinski | |
| 6,266,617 B1 | 7/2001 | Evans | |
| 6,442,485 B2 | 8/2002 | Evans | |
| 6,466,899 B1 | 10/2002 | Yano et al. | |
| 6,665,640 B1 | 12/2003 | Bennett et al. | |
| 6,717,513 B1 | 4/2004 | Sandelman et al. | |
| 6,947,885 B2 | 9/2005 | Bangalore et al. | |
| 7,043,420 B2 | 5/2006 | Ratnaparkhi | |
| 7,167,824 B2 | 1/2007 | Kallulli | |
| 7,231,341 B2 | 6/2007 | Bangalore et al. | |
| 7,238,313 B2 | 7/2007 | Ferencz et al. | |
| 7,305,336 B2 | 12/2007 | Polanyi et al. | |
| 7,310,969 B2 | 12/2007 | Dale | |
| 7,346,493 B2 | 3/2008 | Ringger et al. | |
| 7,418,447 B2 | 8/2008 | Caldwell et al. | |
| 7,424,363 B2 | 9/2008 | Cheng et al. | |
| 7,444,287 B2 | 10/2008 | Claudatos et al. | |
| 7,496,621 B2 | 2/2009 | Pan et al. | |
| 7,526,424 B2 | 4/2009 | Corston-Oliver et al. | |
| 7,533,089 B2 | 5/2009 | Pan et al. | |
| 7,562,005 B1 | 7/2009 | Bangalore et al. | |
| 7,684,991 B2 | 3/2010 | Stohr et al. | |
| 7,711,581 B2 | 5/2010 | Hood et al. | |
| 7,783,486 B2 | 8/2010 | Rosser et al. | |
| 7,809,552 B2 | 10/2010 | Pan et al. | |
| 7,849,048 B2 | 12/2010 | Langseth et al. | |
| 7,849,049 B2 | 12/2010 | Langseth et al. | |
| 7,856,390 B2 | 12/2010 | Schiller | |
| 7,873,509 B1 | 1/2011 | Budzinski | |
| 7,921,091 B2 | 4/2011 | Cox et al. | |
| 7,930,169 B2 | 4/2011 | Billerey-Mosier | |
| 7,933,774 B1 | 4/2011 | Begeja et al. | |
| 7,966,172 B2 | 6/2011 | Ruiz et al. | |
| 7,970,601 B2 | 6/2011 | Burmester et al. | |
| 7,979,267 B2 | 7/2011 | Ruiz et al. | |
| 8,019,610 B2 | 9/2011 | Walker et al. | |
| 8,024,331 B2 | 9/2011 | Calistri-Yeh et al. | |
| 8,037,000 B2 | 10/2011 | Delmonico et al. | |
| 8,082,144 B1 | 12/2011 | Brown et al. | |
| 8,090,727 B2 | 1/2012 | Lachtarnik et al. | |
| 8,150,676 B1 | 4/2012 | Kaeser | |
| 8,175,873 B2 | 5/2012 | Di Fabbrizio et al. | |
| 8,180,647 B2 | 5/2012 | Walker et al. | |
| 8,180,758 B1 | 5/2012 | Cornali | |
| 8,229,937 B2 | 7/2012 | Kiefer et al. | |
| 8,355,903 B1 | 1/2013 | Birnbaum et al. | |
| 8,374,848 B1 | 2/2013 | Birnbaum et al. | |
| 8,425,325 B2 | 4/2013 | Hope | |
| 8,473,911 B1 | 6/2013 | Baxter | |
| 8,494,944 B2 | 7/2013 | Schiller | |
| 8,515,733 B2 | 8/2013 | Jansen | |
| 8,515,737 B2 | 8/2013 | Allen | |
| 8,548,814 B2 | 10/2013 | Manuel-Devadoss | |
| 8,548,915 B2 | 10/2013 | Antebi et al. | |
| 8,561,014 B2 | 10/2013 | Mengusoglu et al. | |
| 8,566,090 B2 | 10/2013 | Di Fabbrizio et al. | |
| 8,589,148 B2 | 11/2013 | Atallah et al. | |
| 8,589,172 B2 | 11/2013 | Alonso et al. | |
| 8,616,896 B2 | 12/2013 | Lennox | |
| 8,620,669 B2 | 12/2013 | Walker et al. | |
| 8,626,613 B2 | 1/2014 | Dale et al. | |
| 8,630,844 B1 | 1/2014 | Nichols et al. | |
| 8,655,889 B2 | 2/2014 | Hua et al. | |
| 8,676,691 B2 | 3/2014 | Schiller | |
| 8,688,434 B1 | 4/2014 | Birnbaum et al. | |
| 8,700,396 B1 | 4/2014 | Mengibar et al. | |
| 8,738,384 B1 | 5/2014 | Bansal et al. | |
| 8,738,558 B2 | 5/2014 | Antebi et al. | |
| 8,762,134 B2 | 5/2014 | Reiter | |
| 8,762,133 B2 | 6/2014 | Reiter | |
| 8,775,161 B1 | 7/2014 | Nichols et al. | |
| 8,825,533 B2 | 9/2014 | Basson et al. | |
| 8,843,363 B2 | 9/2014 | Birnbaum et al. | |
| 8,849,670 B2 | 9/2014 | Di Cristo et al. | |
| 8,886,520 B1 | 11/2014 | Nichols et al. | |
| 8,892,417 B1 | 11/2014 | Nichols et al. | |
| 8,892,419 B2 | 11/2014 | Lundberg et al. | |
| 8,898,063 B1 | 11/2014 | Sykes et al. | |
| 8,903,711 B2 | 12/2014 | Lundberg et al. | |
| 8,903,718 B2 | 12/2014 | Akuwudike | |
| 8,909,595 B2 | 12/2014 | Gandy et al. | |
| 8,914,452 B2 | 12/2014 | Boston et al. | |
| 8,924,330 B2 | 12/2014 | Antebi et al. | |
| 8,930,305 B2 | 1/2015 | Namburu et al. | |
| 8,977,953 B1 | 3/2015 | Pierre et al. | |
| 8,984,051 B2 | 3/2015 | Olsen et al. | |
| 9,002,695 B2 | 4/2015 | Watanabe et al. | |
| 9,002,869 B2 | 4/2015 | Riezler et al. | |
| 9,015,730 B1 | 4/2015 | Allen et al. | |
| 9,028,260 B2 | 5/2015 | Nanjiani et al. | |
| 9,092,276 B2 | 7/2015 | Allen et al. | |
| 9,104,720 B2 | 8/2015 | Rakshit et al. | |
| 9,110,882 B2 | 8/2015 | Overell et al. | |
| 9,110,977 B1 | 8/2015 | Pierre et al. | |
| 9,111,534 B1 | 8/2015 | Sylvester et al. | |
| 9,135,244 B2 | 9/2015 | Reiter | |
| 9,135,662 B2 | 9/2015 | Evenhouse et al. | |
| 9,146,904 B2 | 9/2015 | Allen | |
| 9,164,982 B1 | 10/2015 | Kaeser | |
| 9,190,054 B1 | 11/2015 | Riley et al. | |
| 9,208,147 B1 | 12/2015 | Nichols et al. | |
| 9,224,894 B2 | 12/2015 | Hackenberg et al. | |
| 9,229,927 B2 | 1/2016 | Wolfram et al. | |
| 9,240,197 B2 | 1/2016 | Begeja et al. | |
| 9,244,894 B1 | 1/2016 | Dale et al. | |
| 9,251,134 B2 | 2/2016 | Birnbaum et al. | |
| 9,251,143 B2 | 2/2016 | Bird et al. | |
| 9,263,039 B2 | 2/2016 | Di Cristo et al. | |
| 9,268,770 B1 | 2/2016 | Kursun | |
| 9,323,743 B2 | 4/2016 | Reiter | |
| 9,336,193 B2 | 5/2016 | Logan et al. | |
| 9,396,181 B1 | 7/2016 | Sripada et al. | |
| 9,405,448 B2 | 8/2016 | Reiter | |
| 9,600,471 B2 | 3/2017 | Bradshaw et al. | |
| 9,640,045 B2 | 5/2017 | Reiter | |
| 9,904,676 B2 | 2/2018 | Sripada et al. | |
| 9,990,360 B2 | 6/2018 | Sripada | |
| 10,026,274 B2 | 7/2018 | Reiter | |
| 10,115,202 B2 | 10/2018 | Sripada | |
| 2002/0026306 A1 | 2/2002 | Bangalore et al. | |
| 2002/0116173 A1 | 8/2002 | Ratnaparkhi | |
| 2003/0131315 A1 | 7/2003 | Escher | |
| 2003/0182102 A1 | 9/2003 | Corston-Oliver et al. | |
| 2003/0212145 A1 | 11/2003 | Kallulli | |
| 2004/0246120 A1 | 12/2004 | Benner et al. | |
| 2005/0033582 A1 * | 2/2005 | Gadd | G06Q 30/02 704/277 |
| 2005/0039107 A1 | 2/2005 | Hander et al. | |
| 2005/0228635 A1 | 10/2005 | Araki et al. | |
| 2005/0256703 A1 | 11/2005 | Markel | |
| 2006/0085667 A1 | 4/2006 | Kubota et al. | |
| 2006/0178868 A1 | 8/2006 | Billerey-Mosier | |
| 2006/0259293 A1 | 11/2006 | Orwant | |
| 2007/0078655 A1 | 4/2007 | Semkow et al. | |
| 2007/0106628 A1 | 5/2007 | Adjali et al. | |
| 2007/0129942 A1 | 6/2007 | Ban et al. | |
| 2007/0143099 A1 | 6/2007 | Balchandran et al. | |

(56) References Cited

U.S. PATENT DOCUMENTS

| | | | |
|---|---|---|---|
| 2008/0103756 A1* | 5/2008 | Singh | G06F 17/2881 704/1 |
| 2008/0221865 A1 | 9/2008 | Wellmann | |
| 2008/0221870 A1 | 9/2008 | Attardi et al. | |
| 2008/0243472 A1* | 10/2008 | DeGroot | G06F 17/289 704/2 |
| 2008/0281781 A1 | 11/2008 | Zhao et al. | |
| 2008/0312954 A1 | 12/2008 | Ullrich et al. | |
| 2009/0089100 A1 | 4/2009 | Nenov et al. | |
| 2009/0089126 A1 | 4/2009 | Odubiyi | |
| 2009/0111486 A1 | 4/2009 | Burstrom | |
| 2009/0156229 A1 | 6/2009 | Hein et al. | |
| 2009/0198496 A1 | 8/2009 | Denecke | |
| 2009/0281839 A1 | 11/2009 | Lynn et al. | |
| 2009/0286514 A1 | 11/2009 | Lichorowic et al. | |
| 2009/0287567 A1 | 11/2009 | Penberthy et al. | |
| 2010/0146491 A1 | 6/2010 | Hirano et al. | |
| 2010/0153095 A1 | 6/2010 | Yang et al. | |
| 2010/0174545 A1 | 7/2010 | Otani | |
| 2010/0191658 A1 | 7/2010 | Kannan et al. | |
| 2010/0203970 A1 | 8/2010 | Hope | |
| 2010/0332235 A1 | 12/2010 | David | |
| 2011/0010164 A1 | 1/2011 | Williams | |
| 2011/0068929 A1 | 3/2011 | Franz et al. | |
| 2011/0087486 A1 | 4/2011 | Schiller | |
| 2011/0160986 A1 | 6/2011 | Wu et al. | |
| 2011/0179006 A1 | 7/2011 | Cox et al. | |
| 2011/0218822 A1 | 9/2011 | Buisman et al. | |
| 2011/0225185 A1 | 9/2011 | Gupta | |
| 2011/0257839 A1 | 10/2011 | Mukherjee | |
| 2012/0078888 A1 | 3/2012 | Brown et al. | |
| 2012/0084027 A1 | 4/2012 | Caine | |
| 2012/0109998 A1* | 5/2012 | Patch | G06F 9/454 707/769 |
| 2012/0124176 A1* | 5/2012 | Curtis | G06Q 50/01 709/219 |
| 2012/0136649 A1 | 5/2012 | Freising et al. | |
| 2012/0158089 A1 | 6/2012 | Bocek et al. | |
| 2012/0173475 A1 | 7/2012 | Ash et al. | |
| 2012/0278080 A1* | 11/2012 | Singh | G06F 17/2775 704/257 |
| 2012/0290289 A1 | 11/2012 | Manera et al. | |
| 2012/0310990 A1 | 12/2012 | Viegas et al. | |
| 2012/0323574 A1 | 12/2012 | Wang et al. | |
| 2012/0323576 A1 | 12/2012 | Wang et al. | |
| 2013/0030810 A1 | 1/2013 | Kopparapu et al. | |
| 2013/0066873 A1 | 3/2013 | Salvetti et al. | |
| 2013/0073280 A1 | 3/2013 | O'Neil et al. | |
| 2013/0144606 A1 | 6/2013 | Birnbaum et al. | |
| 2013/0145242 A1 | 6/2013 | Birnbaum et al. | |
| 2013/0151238 A1 | 6/2013 | Beaurpere et al. | |
| 2013/0174026 A1 | 7/2013 | Locke | |
| 2013/0185050 A1 | 7/2013 | Bird et al. | |
| 2013/0185051 A1 | 7/2013 | Buryak et al. | |
| 2013/0211855 A1 | 8/2013 | Eberle et al. | |
| 2013/0238329 A1 | 9/2013 | Casella dos Santos | |
| 2013/0238330 A1 | 9/2013 | Casella dos Santos | |
| 2013/0238987 A1 | 9/2013 | Lutwyche | |
| 2013/0251233 A1 | 9/2013 | Yang et al. | |
| 2013/0262092 A1 | 10/2013 | Wasick | |
| 2013/0268263 A1 | 10/2013 | Park et al. | |
| 2013/0293363 A1 | 11/2013 | Plymouth et al. | |
| 2013/0311201 A1 | 11/2013 | Chatfield et al. | |
| 2014/0019531 A1 | 1/2014 | Czajka et al. | |
| 2014/0025371 A1 | 1/2014 | Min | |
| 2014/0039878 A1 | 2/2014 | Wasson | |
| 2014/0052696 A1 | 2/2014 | Soroushian | |
| 2014/0062712 A1 | 3/2014 | Reiter | |
| 2014/0067377 A1 | 3/2014 | Reiter | |
| 2014/0072947 A1 | 3/2014 | Boguraev et al. | |
| 2014/0072948 A1 | 3/2014 | Boguraev et al. | |
| 2014/0089212 A1 | 3/2014 | Sbodio | |
| 2014/0100846 A1 | 4/2014 | Haine et al. | |
| 2014/0100901 A1 | 4/2014 | Haine et al. | |
| 2014/0100923 A1 | 4/2014 | Strezo et al. | |
| 2014/0136186 A1 | 5/2014 | Adami et al. | |
| 2014/0143720 A1 | 5/2014 | Dimarco et al. | |
| 2014/0149107 A1 | 5/2014 | Schilder | |
| 2014/0164303 A1 | 6/2014 | Bagchi et al. | |
| 2014/0164304 A1 | 6/2014 | Bagchi et al. | |
| 2014/0188477 A1 | 7/2014 | Zhang | |
| 2014/0278358 A1 | 9/2014 | Byron et al. | |
| 2014/0281935 A1 | 9/2014 | Byron et al. | |
| 2014/0281951 A1 | 9/2014 | Megiddo et al. | |
| 2014/0297268 A1 | 10/2014 | Govrin et al. | |
| 2014/0316768 A1 | 10/2014 | Khandekar | |
| 2014/0375466 A1 | 12/2014 | Reiter | |
| 2014/0379322 A1 | 12/2014 | Koutrika et al. | |
| 2014/0379378 A1 | 12/2014 | Cohen-Solal et al. | |
| 2015/0006437 A1 | 1/2015 | Byron et al. | |
| 2015/0032443 A1 | 1/2015 | Karov et al. | |
| 2015/0081299 A1 | 3/2015 | Jasinschi et al. | |
| 2015/0081307 A1 | 3/2015 | Cederstrom et al. | |
| 2015/0081321 A1 | 3/2015 | Jain | |
| 2015/0095015 A1 | 4/2015 | Lani et al. | |
| 2015/0106307 A1 | 4/2015 | Antebi et al. | |
| 2015/0142418 A1 | 5/2015 | Byron et al. | |
| 2015/0142421 A1 | 5/2015 | Buurman et al. | |
| 2015/0154359 A1 | 6/2015 | Harris et al. | |
| 2015/0163358 A1 | 6/2015 | Klemm et al. | |
| 2015/0169522 A1 | 6/2015 | Logan et al. | |
| 2015/0169547 A1 | 6/2015 | Reiter | |
| 2015/0169548 A1 | 6/2015 | Reiter | |
| 2015/0169659 A1 | 6/2015 | Lee et al. | |
| 2015/0169720 A1 | 6/2015 | Byron et al. | |
| 2015/0169737 A1 | 6/2015 | Bryon et al. | |
| 2015/0179082 A1 | 6/2015 | Byron et al. | |
| 2015/0227508 A1 | 8/2015 | Howald et al. | |
| 2015/0242384 A1 | 8/2015 | Reiter | |
| 2015/0261744 A1 | 9/2015 | Suenbuel et al. | |
| 2015/0261836 A1 | 9/2015 | Madhani et al. | |
| 2015/0279348 A1 | 10/2015 | Cao et al. | |
| 2015/0310013 A1 | 10/2015 | Allen et al. | |
| 2015/0310112 A1 | 10/2015 | Allen et al. | |
| 2015/0310861 A1 | 10/2015 | Waltermann et al. | |
| 2015/0324343 A1 | 11/2015 | Carter et al. | |
| 2015/0324347 A1 | 11/2015 | Bradshaw et al. | |
| 2015/0324351 A1 | 11/2015 | Sripada et al. | |
| 2015/0324374 A1 | 11/2015 | Sripada et al. | |
| 2015/0324413 A1 | 11/2015 | Gubin et al. | |
| 2015/0325000 A1 | 11/2015 | Sripada | |
| 2015/0326622 A1 | 11/2015 | Carter et al. | |
| 2015/0331845 A1 | 11/2015 | Guggilla et al. | |
| 2015/0331846 A1 | 11/2015 | Guggilla et al. | |
| 2015/0332670 A1 | 11/2015 | Akbacak et al. | |
| 2015/0347400 A1 | 12/2015 | Sripada | |
| 2015/0356127 A1 | 12/2015 | Pierre et al. | |
| 2015/0363363 A1 | 12/2015 | Bohra et al. | |
| 2015/0363364 A1 | 12/2015 | Sripada | |
| 2015/0363382 A1 | 12/2015 | Bohra et al. | |
| 2015/0363390 A1 | 12/2015 | Mungi et al. | |
| 2015/0363391 A1 | 12/2015 | Mungi et al. | |
| 2015/0371651 A1 | 12/2015 | Aharoni et al. | |
| 2016/0019200 A1 | 1/2016 | Allen | |
| 2016/0027125 A1 | 1/2016 | Bryce | |
| 2016/0055150 A1 | 2/2016 | Bird et al. | |
| 2016/0132489 A1 | 5/2016 | Reiter | |
| 2016/0140090 A1 | 5/2016 | Dale et al. | |
| 2016/0232152 A1 | 8/2016 | Mahamood | |
| 2016/0328385 A1 | 11/2016 | Reiter | |
| 2017/0018107 A1 | 1/2017 | Reiter | |
| 2019/0035232 A1 | 1/2019 | Reiter | |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 5/2006 |

(56) References Cited

FOREIGN PATENT DOCUMENTS

| | | | |
|---|---|---|---|
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 A | 1/2004 |
| JP | 2004165766 A | 9/2014 |
| WO | WO 2000/074394 A2 | 12/2000 |
| WO | WO 2002/031628 A2 | 4/2002 |
| WO | WO 2002/073449 A1 | 9/2002 |
| WO | WO 2002/073531 A1 | 9/2002 |
| WO | WO 2002/031628 A3 | 10/2002 |
| WO | WO 2006/010044 A2 | 1/2006 |
| WO | WO 2007/041221 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

Andre et al., "From Visual Data to Multimedia Presentations," Grounding Representations: Integration of Sensory Information in Natural Language Processing, Artificial Intelligence and Neural networks, IEE Colloquium On, pp. 1-3, (1995).

Andre et al., "Natural Language Access to Visual Data: Dealing with Space and Movement," Report 63, German Research Center for Artificial Intelligence (DFKI) SFB 314, Project VITRA, pp. 1-21, (1989).

Barzilay et al.; "Aggregation via Set Partitioning for Natural Language Generation", Proceedings of the Human Language Technology Conference of the North American Chapter of the ACL; pp. 359-366; (2006).

Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).

Cappozzo et al., "Surface-Marker Cluster Design Criteria for 3-D Bone Movement Reconstruction," IEEE Transactions on Biomedical Engineering, 44(12):1165-1174, (1997).

Dalianis et al.; "Aggregation in Natural Language Generation;" Trends in Natural Language Generation, an Artificial Intelligence Perspective; pp. 88-105; (1993).

Dragon et al., "Multi-Scale Clustering of Frame-to-Frame Correspondences for Motion Segmentation," Computer Vision ECCV, Springer Berlin Heidelberg, pp. 445-458, (2012).

Gatt et al.,"From Data to Text in the Neonatal Intensive Care Unit: Using NLG Technology for Decision Support and Information Management," AI Communication, pp. 153-186, (2009).

Gorelov et al., "Search Optimization in Semistructured Databases Using Hierarchy of Document Schemas," Programming and Computer Software, 31(6):321-331, (2005).

Herzog et al., "Combining Alternatives in the Multimedia Presentation of Decision Support Information for Real-Time Control," IFIP, 15 pages,(1998).

Kottke et al., "Motion Estimation Via Cluster Matching," 8180 IEEE Transactions on Pattern Analysis and Machine Intelligence, 16(11):1128-1132, (1994).

Kukich, "Knowledge-Based Report Generation: A Knowledge-Engineering Approach to Natural Language Report Generation," Dissertation to The Interdisciplinary Department of Information Science, University of Pittsburg, 260 pages, (1983).

Leonov et al., "Construction of an Optimal Relational Schema for Storing XML Documents in an RDBMS Without Using DTD/XML Schema," Programming and Computer Software, 30(6):323-336, (2004).

Perry et al., "Automatic Realignment of Data Structures to Improve MPI Performance," Networks (ICN), Ninth International Conference on Year: 2010, IEEE Conference Publications, pp. 42-47, (2010).

Quinlan, "Induction of Decision Trees," Machine Learning, Kluwer Academic Publishers, 1(1):81-106, (1986).

Radev et al., "Generating Natural Language Summaries from Multiple On-Line Sources," Association of Computational Linguistics, 24(3):469-500, (1998).

Reiter et al., "Building Applied Natural Language Generation Systems," Natural Language Engineering 1 (1), 31 pages, (1995).

Reiter et al.; "Studies in Natural Language Processing—Building Natural Language Generation Systems," Cambridge University Press, (2000).

Reiter, "An Architecture for Data-to-Text Systems," Proceedings of ENLG-2007, pp. 97-104, (2007).

Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.

Spillner et al., "Algorithms for Dispersed Processing," Utility and Cloud Computing (UC), 204 IEEE/ACM 7th International Conference on Year: 2014, IEEE Conferenced Publications, pp. 914-921, (2014).

Voelz et al., "Rocco: A RoboCup Soccer Commentator System," German Research Center for Artificial Intelligence DFKI GmbH, 11 pages, (1999).

Yu et al., "Choosing the Content of Textual Summaries of Large Time-Series Data Sets," Natural Language Engineering, 13:1-28, (2007).

International Preliminary Report on Patentability for Application No. PCT/IB2012/056513 dated May 19, 2015.

International Preliminary Report on Patentability for Application No. PCT/IB2012/056514 dated May 19, 2015.

International Preliminary Report on Patentability for Application No. PCT/IB2012/057773 dated Jun. 30, 2015.

International Preliminary Report on Patentability for Application No. PCT/IB2012/057774 dated Jun. 30, 2015.

International Preliminary Report on Patentability for Application No. PCT/IB2013/050375 dated Jul. 21, 2015.

International Preliminary Report on Patentability for Application No. PCT/IB2013/058131 dated May 5, 2015.

International Preliminary Report on Patentability for Application No. PCT/IB2014/060846 dated Oct. 18, 2016.

International Preliminary Report on Patentability for Application No. PCT/US2012/053115 dated Mar. 3, 2015.

International Preliminary Report on Patentability for Application No. PCT/US2012/053127 dated Mar. 3, 2015

International Preliminary Report on Patentability for Application No. PCT/US2012/053128 dated Mar. 3, 2015.

International Preliminary Report on Patentability for Application No. PCT/US2012/053156 dated Mar. 3, 2015.

International Preliminary Report on Patentability for Application No. PCT/US2012/053183 dated Mar. 3, 2015.

International Preliminary Report on Patentability for Application No. PCT/US2012/061051 dated Mar. 3, 2015.

International Preliminary Report on Patentability for Application No. PCT/US2012/063343 dated May 5, 2015.

International Search Report and Written Opinion for Application No. PCT/IB2012/056513 dated Jun. 26, 2013.

International Search Report and Written Opinion for Application No. PCT/IB2012/056514 dated Jun. 26, 2013.

(56) References Cited

OTHER PUBLICATIONS

International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.
Notice of Allowance for U.S. Appl. No. 14/023,056 dated Apr. 29, 2014.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 14/702,352 dated Oct. 17, 2017.
Notice of Allowance for U.S. Appl. No. 15/421,921 dated Mar. 14, 2018
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 14/702,352 dated Mar. 29, 2017.
Office Action for U.S. Appl. No. 15/074,425 dated Feb. 26, 2018.
Office Action for U.S. Appl. No. 15/074,425 dated May 10, 2017.
Office Action for U.S. Appl. No. 15/074,425 dated Nov. 27, 2018.
Office Action for U.S. Appl. No. 15/188,423 dated Jul. 20, 2018.
Office Action for U.S. Appl. No. 15/188,423 dated Oct. 23, 2017.
Office Action for U.S. Appl. No. 15/188,423 dated Oct. 30, 2018.
Office Action for U.S. Appl. No. 15/421,921 dated Sep. 27, 2017.
Office Action for U.S. Appl. No. 16/009,006 dated Dec. 3, 2018.

Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System and Method for Using Data to Automatically Generate a Narrative Story" filed May 13, 2010.
U.S. Appl. No. 13/186,308; entitled "Method and Apparatus for Triggering the Automatic Generation of Narratives" filed Jul. 19, 2011.
U.S. Appl. No. 13/186,329; entitled "Method and Apparatus for Triggering the Automatic Generation of Narratives" filed Jul. 19, 2011.
U.S. Appl. No. 13/186,337; entitled "Method and Apparatus for Triggering the Automatic Generation of Narratives" filed Jul. 19, 2011.
U.S. Appl. No. 13/186,346; entitled "Method and Apparatus for Triggering the Automatic Generation of Narratives" filed Jul. 19, 2011.
U.S. Appl. No. 13/464,635; entitled "Use of Tools and Abstraction in a Configurable and Portable System for Generating Narratives" filed May 4, 2012.
U.S. Appl. No. 13/464,675; entitled "Configurable and Portable System for Generating Narratives" filed May 4, 2012.
U.S. Appl. No. 13/464,716; entitled "Configurable and Portable System for Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, and Computer Program Product for User-Directed Reporting;" filed Sep. 16, 2013.
U.S. Appl. No. 14/027,775; entitled "Method and Apparatus for Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.
U.S. Appl. No. 15/093,365, filed Apr. 7, 2016; In re: Logan et al., entitled Method and Apparatus for Updating a Previously Generated Text.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
Notice of Allowance for U.S. Appl. No. 15/186,927 dated Dec. 20, 2018.
U.S. Appl. No. 14/702,352, filed May 1, 2015, U.S. Pat. No. 9,904,676, Patented.

* cited by examiner

METHOD AND APPARATUS FOR EXPRESSING TIME IN AN OUTPUT TEXT

CROSS-REFERENCE TO RELATED APPLICATIONS

This application is a continuation of U.S. patent application Ser. No. 14/702,352, titled "METHOD AND APPARATUS FOR EXPRESSING TIME IN AN OUTPUT TEXT," filed May 1, 2015, which is continuation of International Application No. PCT/IB2012/056514, titled "METHOD AND APPARATUS FOR EXPRESSING TIME IN AN OUTPUT TEXT," filed Nov. 16, 2012, the contents of which are hereby incorporated herein by reference in their entirety.

TECHNOLOGICAL FIELD

Embodiments of the present invention relate generally to natural language generation technologies and, more particularly, relate to a method, apparatus, and computer program product for expressing time in an output text.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to linguistically describe a time period detected in a data structure in an output text generated by a natural language generation system. In some example embodiments, a method is provided that comprises identifying the time period to be described linguistically in an output text. The method of this embodiment may also include identifying a communicative context for the output text. The method of this embodiment may also include determining one or more temporal reference frames that are applicable to the time period and are appropriate for the domain defined by the communicative context. The method of this embodiment may also include generating a phrase specification that linguistically describes the time period based on the descriptor that is defined by a temporal reference frame of the one or more temporal reference frames. In some examples, the descriptor specifies a time window that is inclusive of at least a portion of the time period to be described linguistically.

BRIEF DESCRIPTION OF THE DRAWINGS

Figure 1:
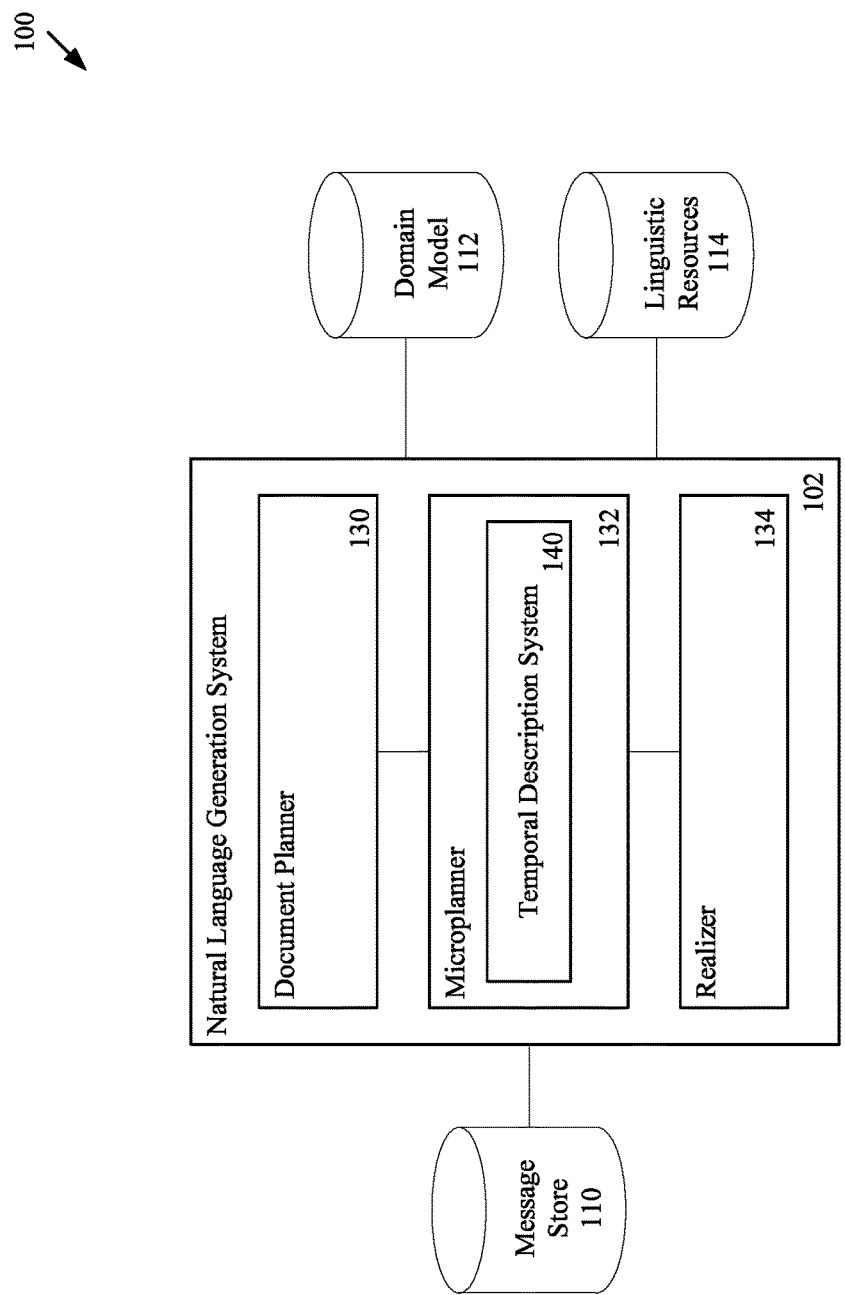
Figure 2:
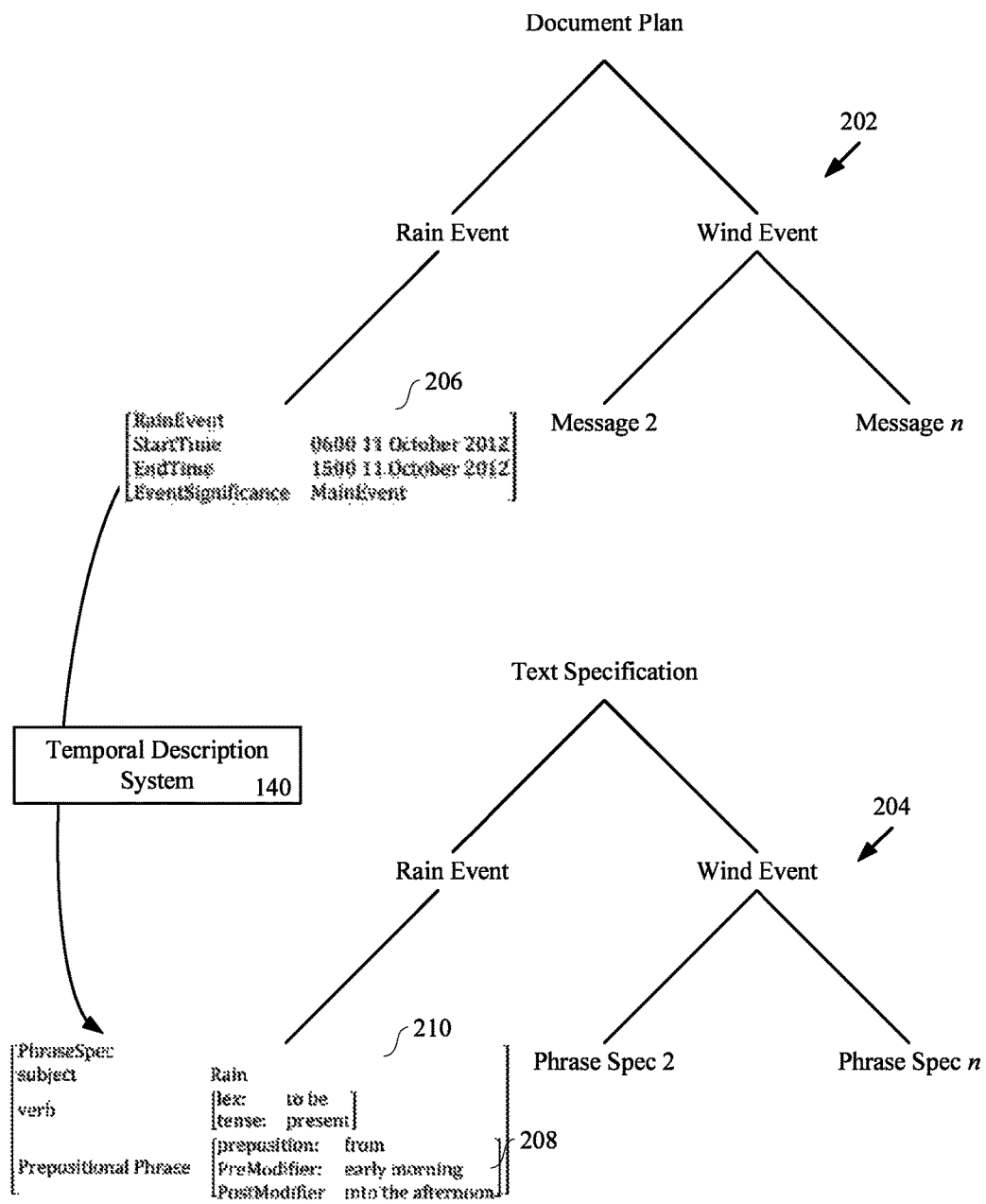
Figure 3:
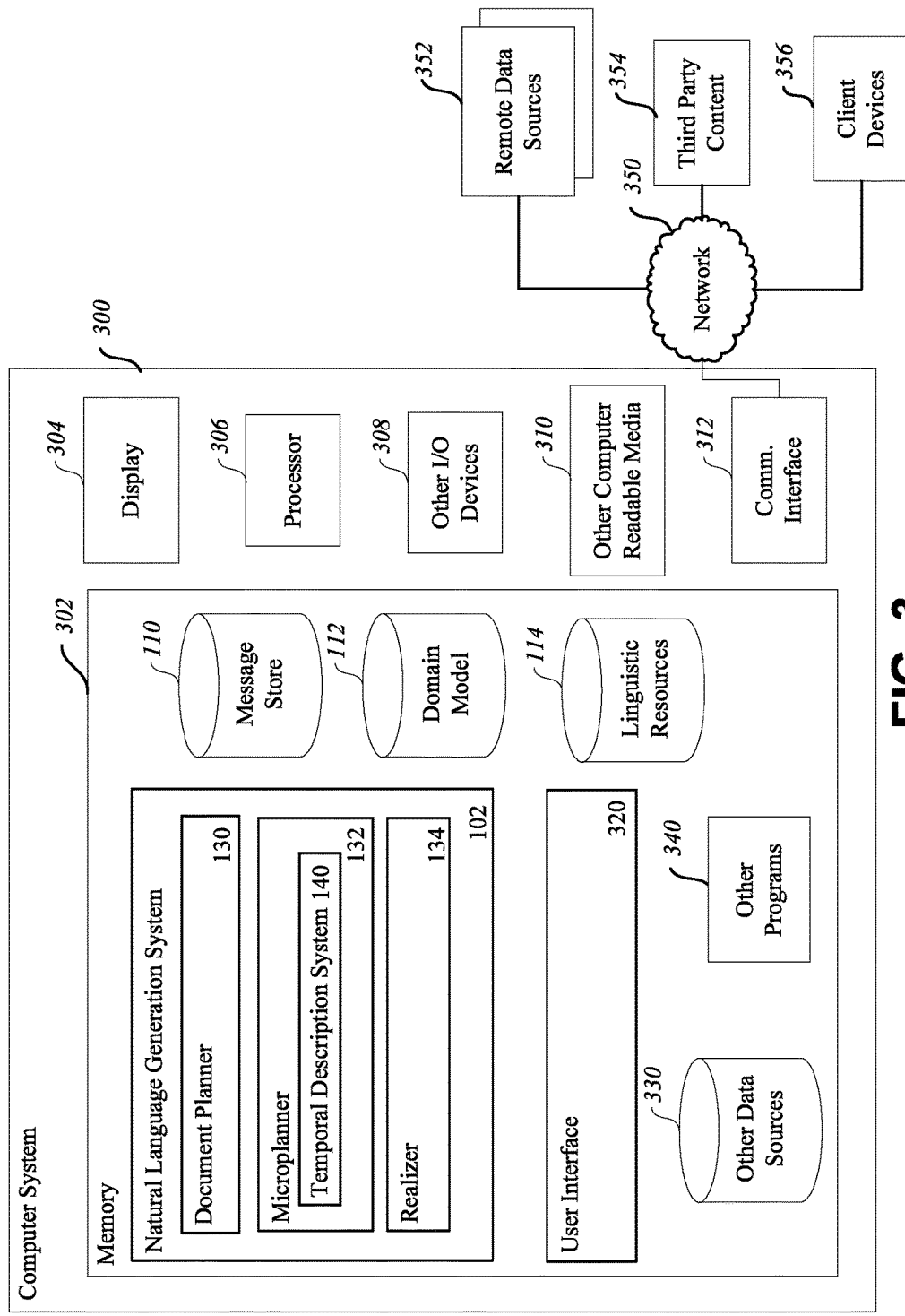
Figure 4:
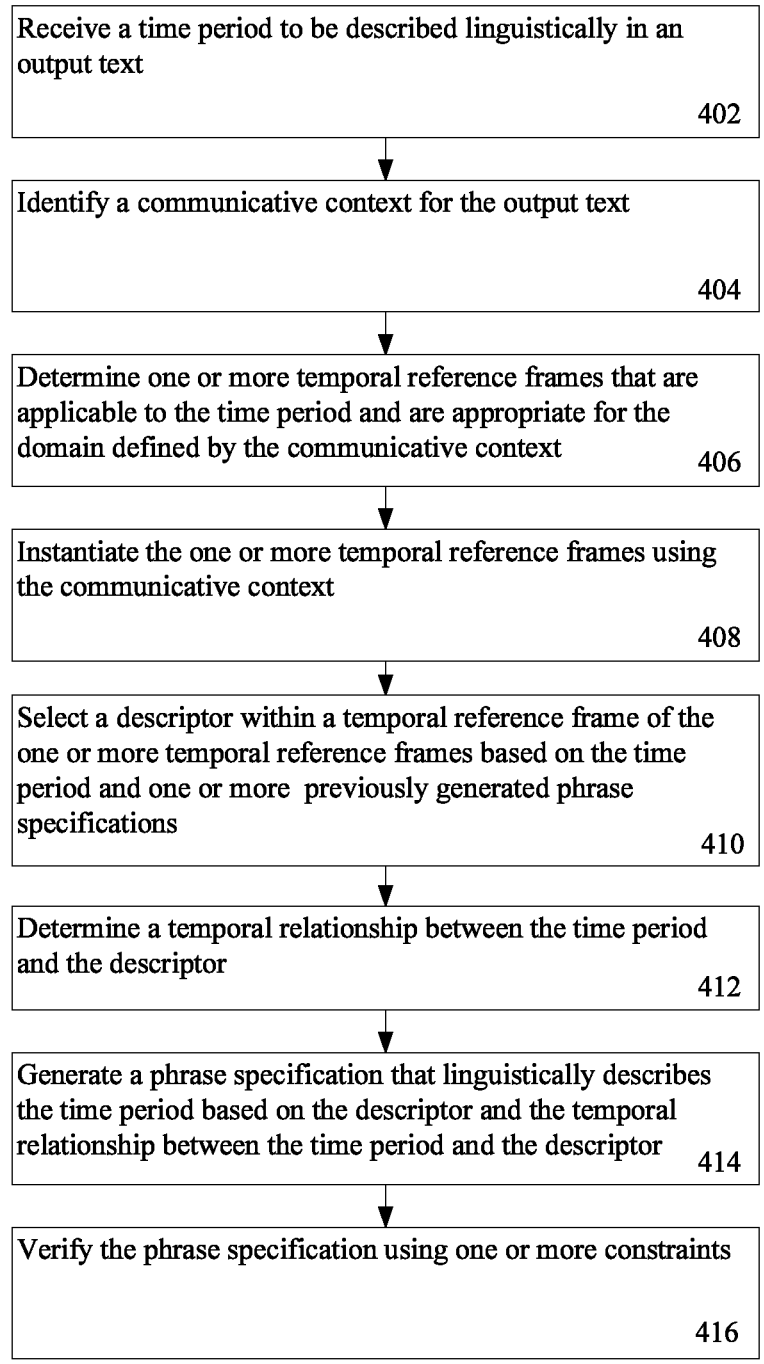

Having thus described embodiments of the invention in general terms, reference will now be made to the accompanying drawings, which are not necessarily drawn to scale, and wherein:

FIG. 1 is a schematic representation of natural language generation environment that may benefit from some example embodiments of the present invention;

FIG. 2 illustrates an example expression of a time using a temporal description system according to some example embodiments described herein;

FIG. 3 illustrates a block diagram of an apparatus that embodies a natural language generation system in accordance with some example embodiments of the present invention; and FIG. 4 illustrates a flowchart that may be performed by a temporal description system in accordance with some example embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Natural language generation systems may be configured to describe a time of an event, happening or the like in an output text. The time of the event may, in some cases, be described by its numerical time, such as "11:02 am", but more often, the time of the event may be referred to by a description of that time period, such as "late morning", "before lunch", "before dawn", "early in the semester" or the like. As such, to generate a description of a time, a natural language generation system may need external information or a communicative context (e.g. the domain of the event, the location of the reader of the output text, the time the output text is generated in comparison to the timing of the event and/or the like) of the output text in order to generate the preferred or otherwise appropriate description of the time. For example, a local time of 6:00 am may be before sunrise in some areas of the world whereas in other locations 6:00 am may be after sunrise. In other examples, "early morning" may be 6 am for a soldier, whereas "early morning" may be 9 am for a professional.

As is described herein and according to some example embodiments, a temporal description system is provided that enables the generation of a linguistic description, based on communicative context, in the form of a phrase specification for a time period that can be incorporated in an output text. A time period is a space of seconds, minutes, hours, days, weeks, months or years with an established beginning date and ending date. A time period may also include and/or be used interchangeably with, for example, a time point, a time window, a duration of time, an instance of time and/or the like.

In some examples, a microplanner may receive a document plan tree that contains or otherwise refers to a message that includes reference to a time period in a slot of the message. In order to convert the time period in the message into a phrase specification or a syntactic constituent for use in a phrase specification that may be processed by a microplanner, the microplanner may call or otherwise access a temporal description system, such as the temporal description system described herein. In some example embodiments, the temporal description system may reference or otherwise utilize one or more temporal reference frames that are aligned to a current communicative context and define one or more descriptors (e.g. linguistic words or phrases that describe a time window) to linguistically describe the time period. A temporal reference frame is a means of partitioning a given timeline into a set of time partitions called descriptors that can be refined based on a hierarchy. For example, a temporal reference frame may relate to seasons and have descriptors called winter, spring, summer and fall. Those descriptors may be refined, such as by using a modifier "early," "middle" and/or "late." As such, the temporal description system may select one of the descriptors that at least partially include the time period received to describe the time period, such as "during the spring." In some examples, a temporal relationship between a time period and a descriptor may be also be linguistically described to provide a more precise time reference, for example "early spring".

FIG. 1 is an example block diagram of example components of an example natural language generation environment 100. In some example embodiments, the natural language generation environment 100 comprises a natural language generation system 102, message store 110, a domain model 112 and/or linguistic resources 114. The natural language generation system 102 may take the form of, for example, a code module, a component, circuitry and/or the like. The components of the natural language generation environment 100 are configured to provide various logic (e.g. code, instructions, functions, routines and/or the like) and/or services related to the natural language generation system, the microplanner and/or a temporal description system.

A message store 110 or knowledge pool is configured to store one or more messages that are accessible by the natural language generation system 102. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology (e.g. a domain model 112) that formally represents knowledge about the application scenario. In some examples, the domain model 112 is a representation of information about a particular domain. For example, a domain model may contain an ontology that specifies the kinds of objects, instances, concepts and/or the like that may exist in the domain in concrete or abstract form, properties that may be predicated of the objects, concepts and the like, relationships that may hold between the objects, concepts and the like, a communicative context and representations of any specific knowledge that is required to function in the particular domain.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it may ultimately be realized by some other linguistic means). For example, to linguistically describe a weather event, such as a rain storm, a user may want to know the location of the rain storm, when it will reach the user's location, the last time rain was detected and/or the like. In some cases, the user may not want to know about a weather event, but instead want to be warned in an instance in which the weather presents a danger in a particular area; for example, "high winds predicted this evening."

In some examples, a message is created in an instance in which the raw input data warrants the construction of such a message. For example, a wind message would only be constructed in an instance in which wind data was present in the raw input data. Alternatively or additionally, while messages may correspond directly to observations taken from a raw data input, others, however, may be derived from the observations by means of a process of inference or based on one or more detected events. For example, the presence of rain may be indicative of other conditions, such as the potential for snow at some temperatures.

Messages may be instantiated based on many variations of source data, such as but not limited to time series data, time and space data, data from multiple data channels, an ontology, sentence or phrase extraction from one or more texts, a text, survey responses, structured data, unstructured data and/or the like. For example, in some cases, messages may be generated based on text related to multiple news articles focused on the same or similar news story in order to generate a news story; whereas, in other examples, messages may be built based on survey responses and/or event data.

Messages may be annotated with an indication of their relative importance; this information can be used in subsequent processing steps or by the natural language generation system 102 to make decisions about which information may be conveyed and which information may be suppressed. Alternatively or additionally, messages may include information on relationships between the one or more messages.

In some example embodiments, a natural language generation system, such as natural language generation system 102, is configured to generate words, phrases, sentences, text or the like which may take the form of a natural language text. The natural language generation system 102 comprises a document planner 130, a microplanner 132 and/or a realizer 134. The natural language generation system 102 may also be in data communication with the message store 110, the domain model 112 and/or the linguistic resources 114. In some examples, the linguistic resources 114 include, but are not limited to, text schemas, communicative context, aggregation rules, reference rules, lexicalization rules and/or grammar rules that may be used by one or more of the document planner 130, the microplanner 132 and/or the realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 is configured to input the one or more messages from the message store 110 and to determine how to arrange those messages in order to describe one or more patterns in the one or more data channels derived from the raw input data. The document planner 130 may also comprise a content determination process that is configured to select the messages, such as the messages that contain a representation of the data that is to be output via a natural language text.

The document planner 130 may also comprise a structuring process that determines the order of messages to be included in a text. In some example embodiments, the document planner 130 may access one or more text schemas for the purposes of content determination and document structuring. A text schema is a rule set that defines the order in which a number of messages are to be presented in a document. For example, a rain message may be described prior to a temperature message. In other examples, a wind message may be described after, but in a specific relation to, the rain message.

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast, sequence and/or the like) to each other. An example document plan is shown with respect to document plan 202 of FIG. 2. An example message is also shown in FIG. 2 as message 206.

The microplanner 132 is configured to construct a text specification based on the document plan from the document planner 130, such that the document plan may be expressed in natural language. In some example embodiments, the microplanner 132 may convert the one or more messages in the document plan into one or more phrase specifications in a text specification. In some example embodiments, the microplanner 132 may perform aggregation, lexicalization and referring expression generation. In some examples, aggregation includes, but is not limited to, determining whether two or more messages can be combined together linguistically to produce a more complex phrase specification. For example, one or more messages may be aggregated so that both of the messages can be described by a single sentence. In some examples, lexicalization includes, but is not limited to, choosing particular words for the expression of concepts and relations. In some examples, referring expression generation includes, but is not limited to, choosing how to refer to an entity so that it can be unambiguously identified by the reader.

In some example embodiments, the microplanner 132 may embody or otherwise may be in data communication with a temporal description system 140. The microplanner 132 may interact with the temporal description system 140 in an instance in which the microplanner detects a time period (e.g. a time point, a time window, a duration or the like) in a slot of a message in the document plan tree received or otherwise accessed via the document planner 130. As such, the temporal description system 140 is configured to determine or otherwise identify the communicative context of an output text as is provided via the domain model 112 and/or the linguistic resources 114. A communicative context is a factor or combinations of factors of the environment in which the events to be described are occurring and which have an influence on the output text. In some example embodiments, the factor or combination of factors may include a domain for which the text is to be generated (e.g. medical, weather, academic, sports and/or the like), a location of a reader of the output text or a location described by the output text (e.g. Scotland may have a later sunrise when compared to Italy), the current time that the output text is being generated (e.g. "6 am" may be an appropriate descriptor for event tomorrow, but "in the morning next month" may be a more appropriate descriptor to identify an event in the future), the time of the event (e.g. in order to set the tense of a verb), user or reader preferences (e.g. "early morning," "6 am" or "0600"), language preferences (e.g. descriptors chosen based on regional dialects), and/or the like.

In some example embodiments, the temporal description system 140 may be configured to output a phrase specification that describes the input time period. The temporal description system 140 may linguistically describe the time period in the phrase specification using generic time descriptors, such as a day name, a date, an hour or the like. However, in other example embodiments, the temporal description system 140 may linguistically describe the time period using a descriptor that is defined by a temporal reference frame. A temporal reference frame is a set of time partitionings that are used to describe time in a particular domain (e.g. trimesters in pregnancy, semesters in a university and/or the like). A descriptor is the linguistically describable name of the various partitionings within a temporal reference frame (e.g. first, second and third trimesters of a pregnancy, fall semester and spring semester in a university and/or the like). The various partitionings may be further refined by using modifiers, may be refined based on a hierarchy and/or the like. In some examples, the temporal reference frames are configured to be aligned to or otherwise instantiated based on the communicative context (e.g. first trimester aligned to the conception date of a pregnancy, fall semester aligned to the fall start date, morning tied to a sunrise time and/or the like) by the temporal description system 140. Descriptors may also be aligned within the temporal reference frames in some example embodiments.

The temporal description system 140, in some example embodiments, may then select a temporal reference frame and a descriptor from the available temporal reference frames. In some examples, the temporal reference frame and a descriptor may be chosen based on whether a particular descriptor describes the entire time period. In other examples, a domain model or the linguistic resources may provide a preferred ordering of temporal reference frames to be used in a particular output text. In other examples, a temporal reference frame and descriptor may be chosen based on previously chosen temporal reference frames or previously generated phrase specifications. By way of example, a previously referred-to temporal reference frame may be solar movement (e.g. before sunrise) and, as such, the temporal description system 140 may subsequently use a day period (e.g. morning or afternoon) temporal reference frame to add to readability and/or variety in the output text.

In some examples, the temporal reference frame and descriptor may be chosen based on a scoring system. The scoring system may be based on the ability of a descriptor to describe the entire time period, the detection of false positives (e.g. describing a time period that does not include the event) or false negatives (e.g. failing to describe a time period that contains the event) based on the descriptor and/or the like. In some examples, the temporal reference frame may be selected by the temporal description system 140 randomly. Alternatively or additionally, multiple descriptors within a reference frame may be used to describe a time period.

Once a temporal reference frame and one or more descriptors have been identified, the temporal description system 140 is configured to determine a temporal relationship between the time period and the one or more descriptors. For example, if a single descriptor, such as day period, is used, a temporal relationship may be defined as "early," "late" or "mid" if the time period relates to the descriptor in such a way (e.g. 8 am is "early in the day"). In an instance in which two or more descriptors are used, the temporal relationship between the time period and the descriptors may be defined by describing the time period as "between" or "overlapping" (e.g. "between lunch and dinner" or "shift 1 overlaps shift 2").

Using the temporal reference frame, the one or more descriptors and the determined relationship, the temporal description system 140 is configured to generate a phrase specification subject to one or more constraints. Constraints may include, but are not limited to, constraints imposed by a domain model, user preferences, language constraints, output text length constraints, readability and variety constraints, previously referred to temporal reference frames, previous phrase specifications and/or the like. The temporal description system may then output or otherwise provide the phrase specification to the microplanner 132 to be used in a text specification as its own phrase specification or more likely incorporated inside another phrase specification. The output of the microplanner 132, in some example embodiments, is a tree-structured realization specification whose leaf-nodes are phrase specifications, and whose internal nodes express rhetorical relations between the leaf nodes.

A realizer 134 is configured to traverse a text specification output by the microplanner 132 to express the text specification in natural language. The realization process that is applied to each phrase specification and further makes use of a grammar (e.g. the grammar of the linguistic resources 114), which specifies the valid syntactic structures in the language and further provides a way of mapping from phrase specifications into the corresponding natural language sentences. The output of the process is, in some example embodiments, a natural language text. In some examples, the natural language text may include embedded mark-up.

FIG. 2 illustrates an example expression of a time period using a temporal description system according to some example embodiments described herein. In some examples, and by using the systems and methods described with respect to FIG. 1, a time period described in a message may be linguistically described via a temporal description system. One or more non-limiting examples of various operations of the temporal description system will now be described with respect to FIG. 2.

In one example, the timing of weather events may make use of domain specific temporal reference frames, such solar movement (e.g. before or after sunrise), day period (e.g. morning, afternoon, evening), mealtime (e.g. around lunch), time (e.g. before 5 pm) and/or the like. As such, and according to some example embodiments, a microplanner may detect a message, such as message 206 in document plan 202 that contains a time period such as a start time (e.g. StartTime=0600 11 October 2012) and an end time (e.g. EndTime=1500 11 October 2012). The microplanner, when converting the message to a phrase specification, is configured to call or otherwise access the temporal description system 140 to convert the time period defined by the StartTime and the EndTime into a phrase specification, such as phrase specification 208 that is part of phrase specification 210 in the text specification 204 (e.g. "from early morning into the afternoon"). Using the message 206 and the phrase specification 210, a text may be generated (e.g. via the realizer) such as: "rain is expected from early morning into the afternoon."

In further examples, a document plan may have multiple messages having references to one or more time periods. As such, multiple temporal reference frames may be used to describe the multiple time periods. For example, the following text uses four temporal reference frames: "showers are likely to develop before sunrise before clearing into the morning. There should be some sunny spells around lunchtime lasting until around 5 pm." The four example temporal reference frames selected by the temporal description system, in this example, are: solar movement ("before sunrise"), day period ("into the morning"), mealtime ("around lunchtime") and time ("around 5 pm"). In other examples, the temporal description system 140 may also select alternate temporal reference frames. Alternatively or additionally, the temporal reference frames may be used in a different order, such as is shown in the following text: "Showers are likely to develop during the early morning before clearing later. There should be some sunny spells from midday lasting into the evening."

By way of another example in a medical domain, a time period used to describe a key event during a pregnancy could be described as occurring during the following non-exhaustive list of temporal reference frames: month number (e.g. "in the 6th month"), trimester (e.g. "during the 2nd trimester"), month name (e.g. "during July"), week number (e.g. "in week 30"), day number (e.g. "around day 210") as well as simply giving a date or time (e.g. "Friday", "July 5", "5 am" or the like). By way of further example, the temporal reference frame TRIMESTER may include example descriptors "first trimester", "second trimester" or "third trimester". As such, using the domain-specific temporal reference frames, an example output text may include three descriptors that belong to three different temporal reference frames: "During the 2nd trimester, the baby developed as expected. There were concerns during April that the baby was starting to turn but these concerns have subsided due to the baby turning back to the normal position on day 90 of this pregnancy." In this example, the baby's development has been detected as fine for a 3-month-long period. Without the introduction of the TRIMESTER temporal reference frame, another descriptor may have been used, such as "May to July," but this may, in some examples, result in fairly repetitive and limited text. By enabling the temporal description system 140 to describe the same time span using multiple descriptors, advantageously, for example, a greater variation in descriptors may be achieved in the resultant output text. Alternatively or additionally, temporal reference frames may be reused in some example embodiments.

In some examples, the temporal description system 140 is configured to use descriptors such as sunrise and sunset times for a specific location along with the time of day and span of an input time period to generate an output text to linguistically describe a time period. By making use of sunrise and sunset times, it is also possible to take into account the time of year when creating the linguistic description of the input time period. For example, during the summer, the night time is shorter than in the middle of winter. Therefore the time period that can be linguistically described as "morning" covers a longer time period if the input time period is during the summer than if the input time period was during the winter. Further, during the winter, the sun may only be up in the morning for a few hours in some locations, therefore the temporal description system 140 may not need to describe a relationship between the time period and the descriptor and, as such, may drop "early" from "early morning."

FIG. 3 is an example block diagram of an example computing device for practicing embodiments of an example temporal description system. In particular, FIG. 3 shows a computing system 300 that may be utilized to implement a natural language generation environment 100 having a natural language generation system 102 including, in some examples, a document planner 130, a microplanner 132 and/or a realizer 134 and/or a user interface 320. One or more general purpose or special purpose computing systems/devices may be used to implement the natural language generation system 102 and/or the user interface 320. In addition, the computing system 300 may comprise one or more distinct computing systems/devices and may span distributed locations. In some example embodiments, the natural language generation system 102 may be configured to operate remotely via the network 350. In other example embodiments, a pre-processing module or other module that requires heavy computational load may be configured to perform that computational load and thus may be on a remote device or server. For example, the realizer 134 or the temporal description system may be accessed remotely. In other example embodiments, a user device may be configured to operate or otherwise access the natural language generation system 102. Furthermore, each block shown may represent one or more such blocks as appropriate to a specific example embodiment. In some cases one or more of the blocks may be combined with other blocks. Also, the natural language generation system 102 may be implemented in software, hardware, firmware, or in some combination to achieve the capabilities described herein.

In the example embodiment shown, computing system 300 comprises a computer memory ("memory") 302, a display 304, one or more processors 306, input/output devices 308 (e.g., keyboard, mouse, CRT or LCD display, touch screen, gesture sensing device and/or the like), other computer-readable media 310, and communications interface 312. The processor 306 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 306 comprises a plurality of processors. The plurality of processors may be in operative communication with each other and may be collectively configured to perform one or more functionalities of the temporal description system as described herein.

The natural language generation system 102 is shown residing in memory 302. The memory 302 may comprise, for example, transitory and/or non-transitory memory, such as volatile memory, non-volatile memory, or some combination thereof. Although illustrated in FIG. 3 as a single memory, the memory 302 may comprise a plurality of memories. The plurality of memories may be embodied on a single computing device or may be distributed across a plurality of computing devices collectively configured to function as the natural language system, the microplanner and/or the temporal description system. In various example embodiments, the memory 302 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the natural language generation system 102 may be stored on and/or transmitted over the other computer-readable media 310. The components of the natural language generation system 102 preferably execute on one or more processors 306 and are configured to enable operation of a temporal description system, as described herein.

Alternatively or additionally, other code or programs 340 (e.g., an administrative interface, one or more application programming interface, a Web server, and the like) and potentially other data repositories, such as other data sources 330, also reside in the memory 302, and preferably execute on one or more processors 306. Of note, one or more of the components in FIG. 3 may not be present in any specific implementation. For example, some embodiments may not provide other computer readable media 310 or a display 304.

The natural language generation system 102 is further configured to provide functions such as those described with reference to FIG. 1. The natural language generation system 102 may interact with the network 350, via the communications interface 312, with remote data sources 352 (e.g. remote reference data, remote performance data, remote aggregation data, remote knowledge pools and/or the like), third-party content providers 354 and/or client devices 356. The network 350 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instances, the network 350 may take the form of the internet or may be embodied by a cellular network such as an LTE based network. In this regard, the communications interface 312 may be capable of operating with one or more air interface standards, communication protocols, modulation types, access types, and/or the like. The client devices 356 include desktop computing systems, notebook computers, mobile phones, smart phones, personal digital assistants, tablets and/or the like. In some example embodiments, a client device may embody some or all of computing system 300.

In an example embodiment, components/modules of the natural language generation system 102 are implemented using standard programming techniques. For example, the natural language generation system 102 may be implemented as a "native" executable running on the processor 306, along with one or more static or dynamic libraries. In other embodiments, the natural language generation system 102 may be implemented as instructions processed by a virtual machine that executes as one of the other programs 340. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 102, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The message store 110, the domain model 112 and/or the linguistic resources 114 may be implemented as one or more database systems, file systems, or any other technique for storing such information, or any combination of the above, including implementations using distributed computing techniques. Alternatively or additionally, the message store 110, the domain model 112 and/or the linguistic resources 114 may be local data stores but may also be configured to access data from the remote data sources 352.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 4 is a flowchart illustrating an example method performed by a temporal description system in accordance with some example embodiments described herein. As is shown in operation 402, an apparatus may include means, such as the microplanner 132, the temporal description system 140, the processor 306, or the like, for receiving a time period to be described linguistically in an output text. In some example embodiments, the time period may define a time point or a series of time points. As is shown in operation 404, an apparatus may include means, such as the microplanner 132, the temporal description system 140, the processor 306, or the like, for identifying a communicative context for the output text.

As is shown in operation 406, an apparatus may include means, such as the microplanner 132, the temporal description system 140, the processor 306, or the like, for determining one or more temporal reference frames that are applicable to the time period and are appropriate for the domain defined by the communicative context. For example, the temporal reference frame that is partitioned into trimesters that define a pregnancy term would likely only be appropriate for the medical domain and not for the weather domain. As is shown in operation 408, an apparatus may include means, such as the microplanner 132, the temporal description system 140, the processor 306, or the like, for instantiating or otherwise aligning the one or more temporal reference frames to the communicative context. For example, if the temporal reference frame is partitioned into trimesters that define a pregnancy term, then an example first trimester would be instantiated with the conception date and a date three months later.

As is shown in operation 410, an apparatus may include means, such as the microplanner 132, the temporal description system 140, the processor 306, or the like, for selecting a descriptor within a temporal reference frame of the one or more temporal reference frames based on the time period and one or more previously generated phrase specifications. As is described herein, a temporal reference frame may be chosen at random, may be selected by a user, may be dictated by a domain model and/or the like. In some examples, a temporal reference frame may be different than the previously referred-to temporal reference frame. In some example embodiments, each temporal reference frame of the one or more temporal reference frames are partitioned, such that a descriptor is configured to linguistically describe each partition (e.g. each partition or descriptor has a linguistically-expressible name).

As is shown in operation 412, an apparatus may include means, such as the microplanner 132, the temporal description system 140, the processor 306, or the like, for determining a temporal relationship between the time period and the descriptor. For example the time period may be at the beginning of a descriptor. As such, the relationship may, for example, be "early" in the descriptor "March." As is shown in operation 414, an apparatus may include means, such as the microplanner 132, the temporal description system 140, the processor 306, or the like, for generating a phrase specification based on the descriptor and the temporal relationship between the time period and the descriptor. As is shown in operation 416, an apparatus may include means, such as the microplanner 132, the temporal description system 140, the processor 306, or the like, for verifying the phrase specification using one or more constraints. A constraint may include, but is not limited to, verifying that the same descriptor is not used consecutively in the same sentence, that a descriptor is not used incorrectly within a communicative context (e.g. 6 am is not described as "morning" when the sun has not yet risen), context based constraints, constraints due to the text length and/or the like.

FIG. 4 illustrates an example flowchart of the operations performed by an apparatus, such as computing system 300 of FIG. 3, in accordance with example embodiments of the present invention. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 302 of an apparatus employing an embodiment of the present invention and executed by a processor 306 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart's block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart's block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart's block(s). As such, the operations of FIG. 4, when executed, convert a computer or processing circuitry into a particular machine configured to perform an example embodiment of the present invention. Accordingly, the operations of FIG. 4 define an algorithm for configuring a computer or processor, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method comprising:
   identifying, using a processor, a time period to be described linguistically in an output text and one or more linguistic resources for the output text; and
   generating, using the processor, a linguistic description of the time period based on a descriptor that is defined by a temporal reference frame of one or more temporal reference frames, the one or more temporal reference frames applicable to the time period and a domain defined by the one or more linguistic resources, the temporal reference frame enabling a greater variation in descriptors for generating the linguistic description than had the descriptor not been defined by the temporal reference frame.

2. A method according to claim 1, further comprising:
   determining, using the processor, the one or more temporal reference frames;
   instantiating or aligning, using the processor, the one or more temporal reference frames to the one or more linguistic resources; and
   selecting, using the processor, the descriptor defined by the temporal reference frame of the one or more temporal reference frames based on the time period and one or more previously generated linguistic descriptions.

3. A method according to claim 1, further comprising:
   determining, using the processor, a temporal relationship between the time period and the descriptor, wherein the linguistic description is further based on the temporal relationship between the time period and the descriptor, wherein the descriptor specifies a time window that is inclusive of at least a portion of the time period to be described.

4. A method according to claim 3, further comprising:
verifying, using the processor, the linguistic description using one or more constraints.

5. A method according to claim 1, further comprising:
identifying, using the processor, another time period to be described linguistically; and
determining, using the processor, a descriptor that is defined by another temporal reference frame of the one or more temporal reference frames.

6. A method according to claim 5, wherein the descriptor for the another time period is different from the descriptor used for the time period.

7. A method according to claim 1, wherein each temporal reference frame of the one or more temporal reference frames are partitioned, such that a descriptor is configured to linguistically describe each partition.

8. A method according to claim 7, wherein the one or more linguistic resources is defined by at least one of a domain model, a current time or a current location.

9. A method according to claim 1, wherein the time period comprises at least one of a time point or a series of time points.

10. A method of claim 1, further comprising:
determining, using the processor, that a single descriptor does not specify a time window that is inclusive of the time period to be described linguistically; and
determining, using the processor, two or more descriptors that are defined by a temporal reference frame of the one or more temporal reference frames, wherein the two or more descriptors specify a time window that is inclusive of the time period to be described linguistically.

11. An apparatus comprising at least one processor and at least one memory including computer program code, the at least one memory and the computer program code configured to, with the at least one processor, cause the apparatus to:
identify a time period to be described linguistically in an output text and one or more linguistic resources for the output text; and
generate a linguistic description of the time period based on a descriptor that is defined by a temporal reference frame of one or more temporal reference frames, the one or more temporal reference frames applicable to the time period and a domain defined by the one or more linguistic resources, the temporal reference frame enabling a greater variation in descriptors for generating the linguistic description than had the descriptor not been defined by the temporal reference frame.

12. An apparatus according to claim 11, wherein the at least one memory including the computer program code is further configured to, with the at least one processor, cause the apparatus to:
determine the one or more temporal reference frames;
align the one or more temporal reference frames to the one or more linguistic resources; and
select the descriptor defined by the temporal reference frame of the one or more temporal reference frames based on the time period and one or more previously generated linguistic descriptions.

13. An apparatus according to claim 11, wherein the at least one memory including the computer program code is further configured to, with the at least one processor, cause the apparatus to:
determine a temporal relationship between the time period and the descriptor, wherein the linguistic description is further based on the temporal relationship between the time period and the descriptor, wherein the descriptor specifies a time window that is inclusive of at least a portion of the time period to be described.

14. An apparatus according to claim 13, wherein the at least one memory including the computer program code is further configured to, with the at least one processor, cause the apparatus to:
verify the linguistic description using one or more constraints.

15. An apparatus according to claim 11, wherein the at least one memory including the computer program code is further configured to, with the at least one processor, cause the apparatus to:
identify another time period to be described linguistically; and
determine a descriptor that is defined by another temporal reference frame of the one or more temporal reference frames.

16. An apparatus according to claim 15, wherein the descriptor for the another time period is different from the descriptor used for the time period.

17. An apparatus according to claim 11, wherein each temporal reference frame of the one or more temporal reference frames are partitioned, such that a descriptor is configured to linguistically describe each partition.

18. An apparatus according to claim 17, wherein the one or more linguistic resources is defined by at least one of a domain model, a current time or a current location.

19. An apparatus according to claim 11, wherein the time period comprises at least one of a time point or a series of time points.

20. An apparatus of claim 11, wherein the at least one memory including the computer program code is further configured to, with the at least one processor, cause the apparatus to:
determine that a single descriptor does not specify a time window that is inclusive of the time period to be described linguistically; and
determine two or more descriptors that are defined by a temporal reference frame of the one or more temporal reference frames, wherein the two or more descriptors specify a time window that is inclusive of the time period to be described linguistically.

21. A computer program product comprising at least one computer readable non-transitory memory medium having program code instructions stored thereon, the program code instructions which when executed by an apparatus cause the apparatus at least to:
identify a time period to be described linguistically in an output text and one or more linguistic resources for the output text; and
generate a linguistic description of the time period based on a descriptor that is defined by a temporal reference frame of one or more temporal reference frames, the one or more temporal reference frames applicable to the time period and a domain defined by the one or more linguistic resources, the temporal reference frame enabling a greater variation in descriptors for generating the linguistic description than had the descriptor not been defined by the temporal reference frame.

* * * * *